USO11562260B2

(12) United States Patent
Narendra et al.

(10) Patent No.: US 11,562,260 B2
(45) Date of Patent: Jan. 24, 2023

(54) SYSTEM AND METHOD FOR MOBILE DEVICE LOCATIONING (71) Applicant: Zebra Technologies Corporation, Lincolnshire, IL (US)

(72) Inventors: Patrenahalli M. Narendra, Hoffman Estates, IL (US); Robert A. Biggs, Evanston, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 1154 days.

(21) Appl. No.: 16/047,270

(22) Filed: Jul. 27, 2018

(65) Prior Publication Data

US 2020/0034721 A1 Jan. 30, 2020

(51) Int. Cl.
*H04W 4/02* (2018.01)
*H04W 4/029* (2018.01)
*G06N 5/04* (2006.01)
*G06K 7/14* (2006.01)
*G06N 3/08* (2006.01)

(52) U.S. Cl.
CPC ............. *G06N 5/04* (2013.01); *G06K 7/1413* (2013.01); *G06N 3/08* (2013.01); *H04W 4/023* (2013.01); *H04W 4/029* (2018.02)

(58) Field of Classification Search
CPC ........... G06N 5/04; G06N 3/08; H04W 4/023; H04W 4/029
See application file for complete search history.

(56) References Cited

U.S. PATENT DOCUMENTS

| | | | |
|---|---|---|---|
| 6,249,252 B1* | 6/2001 | Dupray | G01S 5/0252 |
| | | | 342/357.29 |
| 9,698,841 B2 | 7/2017 | Alonso et al. | |
| 10,142,794 B1* | 11/2018 | Diamanti | G06N 20/00 |
| 10,271,179 B1* | 4/2019 | Shima | G01S 5/0278 |
| 2008/0153507 A1* | 6/2008 | Taaghol | H04W 64/00 |
| | | | 455/456.1 |
| 2014/0064112 A1* | 3/2014 | Das | H04W 4/024 |
| | | | 370/252 |
| 2014/0187257 A1* | 7/2014 | Emadzadeh | H04W 4/023 |
| | | | 455/456.1 |
| 2015/0350843 A1* | 12/2015 | Jensen | H04L 67/26 |
| | | | 455/456.3 |
| 2017/0332205 A1* | 11/2017 | Shim | G06N 5/04 |
| 2019/0037358 A1* | 1/2019 | Jenkins | H04W 4/029 |

* cited by examiner

*Primary Examiner* — Kostas J Katsikis (57) ABSTRACT

A method of determining a location of a mobile device in a system having a plurality of fixed transmitters includes: obtaining, at the mobile device, inference model data defining a plurality of node operations; collecting, at the mobile device, respective proximity indicators corresponding to a subset of the fixed transmitters, each proximity indicator representing a proximity of the mobile device to the respective fixed transmitter; at the mobile device, generating a location according to the proximity indicators and the node operations; and presenting the location.

28 Claims, 9 Drawing Sheets

SYSTEM AND METHOD FOR MOBILE DEVICE LOCATIONING

BACKGROUND

Mobile computing devices, such as a smart phones, handheld barcode scanners, mobile radio frequency identification (RFID) readers, mobile label printers, and the like, operate in a variety of environments. Such environments can include facilities such as warehouses, retail stores, and the like, in which locationing systems such as the global positioning system (GPS) may not be available. Determining the location of mobile devices in such environments typically requires the deployment of navigational aids within the environment, and also of a host computing device (e.g. a server). The mobile devices may then be configured to gather data from the navigational aids and provide the data to the server, which determines an estimated location of the mobile device based on the above-mentioned data and previously known locations of the navigational aids. Locationing as described above is therefore costly (e.g. due to infrastructural requirements), and may also suffer from reduced accuracy due to multipath RF propagation and noisy measurements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of determining a location of a mobile device in a system having a plurality of fixed transmitters, the method including: obtaining, at the mobile device, inference model data defining a plurality of node operations; collecting, at the mobile device, respective proximity indicators corresponding to a subset of the fixed transmitters, each proximity indicator representing a proximity of the mobile device to the respective fixed transmitter; at the mobile device, generating a location according to the proximity indicators and the node operations; and presenting the location.

Additional examples disclosed herein are directed to a mobile device, comprising: a memory; a sensor configured to detect a plurality of fixed transmitters; a processor interconnected with the memory and the sensor, the processor configured to: obtain inference model data defining a plurality of node operations; collect respective proximity indicators corresponding to a subset of the fixed transmitters, each proximity indicator representing a proximity of the mobile device to the respective fixed transmitter; generate a location according to the proximity indicators and the node operations; and present the location.

Figure 1:
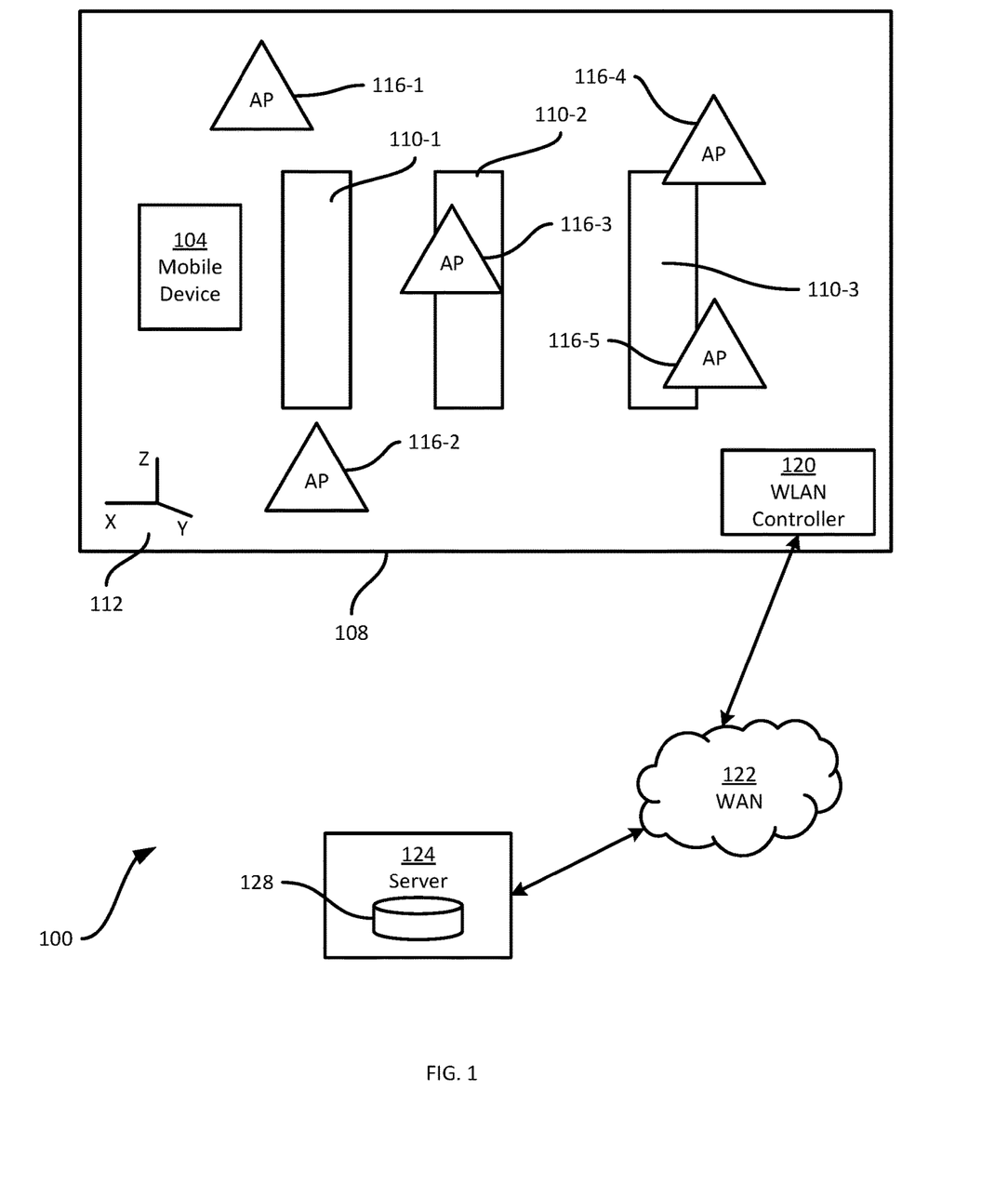
FIG. 1 is a schematic of a communication system.

FIG. 1 depicts a communication system 100, including a mobile computing device 104, also referred to as the device 104 in the discussion below. The device 104 can be any one of a variety of computing devices, including a smart phone, smart glasses, a head-mounted display, a laptop computer, a tablet computer, a mobile (e.g. handheld) barcode scanner, a mobile (e.g. handheld) RFID reader, and the like. The device 104, and other mobile computing devices (not shown), is deployed within an operational environment 108 such as a warehouse, a retail store, a manufacturing facility, or the like. The environment 108 may include a plurality of structures, such as support structures 110-1, 110-2, 110-3, which in the present example are shelf modules carrying products (e.g. in a retail store). Locations within the environment 108 are represented, for example, according to a frame of reference 112 established within the environment. The support structures 110 are fixed within the environment 108, and therefore have predefined, static locations in the frame of reference 112.

The system 100 also includes a plurality of fixed transmitters deployed within the environment 108. In the illustrated embodiment, the fixed transmitters are wireless access points 116, five examples of which are shown (116-1, 116-2, 116-3, 116-4 and 116-5, referred to collectively as the access points 116, and generically as an access point 116). In other embodiments, the fixed transmitters include, in addition to or instead of the access points 116, beacons (e.g. Bluetooth beacons), audio transducers (e.g. ultrasonic transducers), and emitters of visible light, such as lights employing visible light communication (VLC) to transmit data. The fixed transmitters transmit data enabling the mobile device 104 to determine its location within the environment. The data transmitted by each transmitter includes at least an identifier of the transmitter (e.g. the access points 116 transmit media access control (MAC) addresses).

The fixed transmitters are referred to as fixed because, in contrast with the device 104, which is substantially freely moveable throughout the environment 108, the fixed transmitters typically remain stationary within the environment 108, although the transmitters may be periodically relocated during reconfiguration of the environment 108. Thus, the fixed transmitters, like the support structures 110, have predefined, static locations in the frame of reference 112.

The access points 116, as will now be apparent, implement a wireless local area network (WLAN), for example along with a WLAN controller 120 to which the access points 116 are connected. The WLAN may be based, for example, on a suitable one of the IEEE 802.11 family of wireless communication standards (generally referred to as Wi-Fi). The device 104 is configured to interact with the access points 116 to exchange data with other computing devices via the WLAN, and optionally via a wide-area network (WAN) 122, such as the Internet. An example of such another computing device is a server 124 connected to the WAN 122. The server 124 is illustrated as being external to the environment 108, but in other embodiments the server 124 can be deployed within the environment 108. The server 124 maintains a repository 128, which may contain locations in the frame of reference 112 for the fixed transmitters, as well as for the support structures 110. In other words, the repository 128 can contain a map of the environment 108. Further, the repository 128 can contain a planogram indicating the location of products, shelf labels (not shown) and the like in the frame of reference, as will be discussed in greater detail below.

As will be discussed in greater detail below, the device 104 is configured to collect data transmitted by the fixed transmitters of the system 100 deployed within the environment 108, and to employ the collected data to determine a location of the device 104 according to the frame of reference 112. Thus, in the illustrated embodiment the device 104 is configured to determine a location in the frame of reference 112 based on data collected from the access points 116. In other embodiments, the determination of a location by the device 104 is based on data collected from additional fixed transmitters within the environment, as well as or instead of data collected from the access points 116. In some embodiments, the device 104 is also configured, prior to determining a location, to collect and provide training data to the server 124 for use in generating an inference model to enable the device 104 to perform the above-mentioned location determinations.

Figure 2:
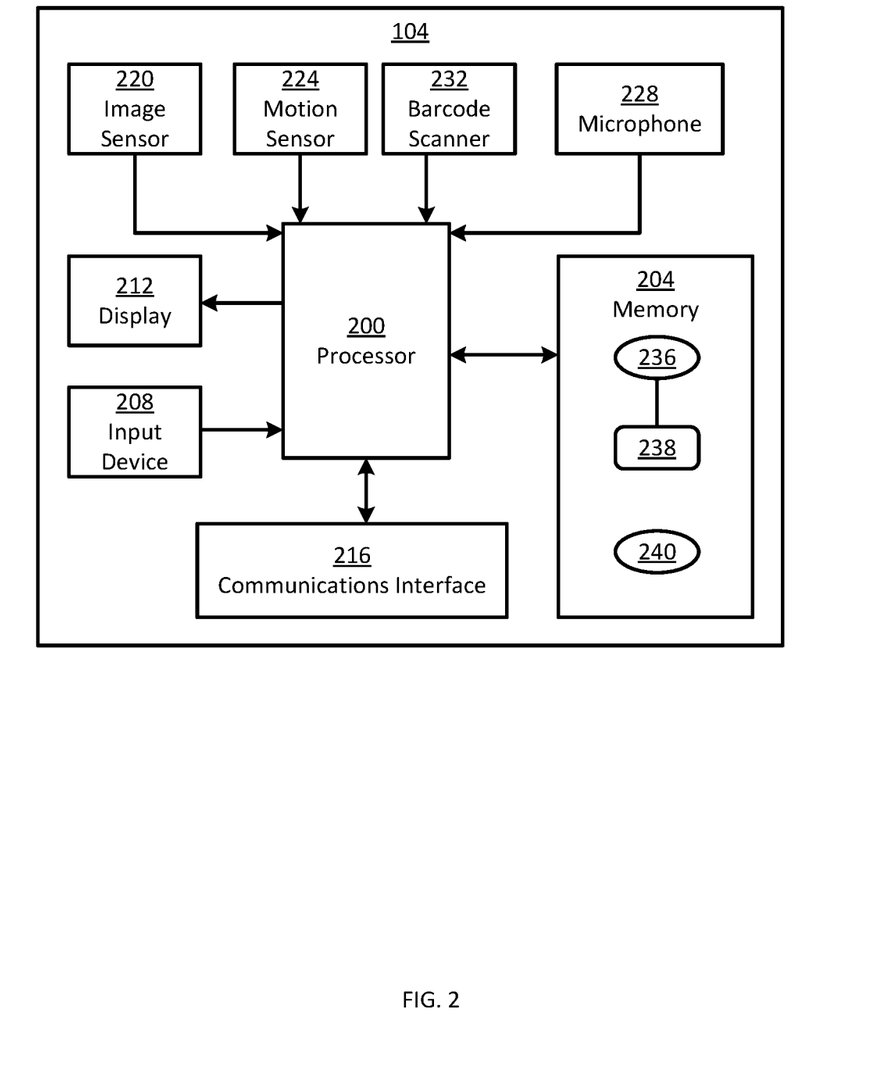
FIG. 2 is a block diagram of certain internal components of a mobile device in the system of FIG. 1.

Before discussing the locationing-related functionality implemented by the device 104, certain internal components of the device 104 will be described in greater detail with reference to FIG. 2. The device 104 includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes an input device 208 interconnected with the processor 200, such as a touch screen, a keypad, a trigger (e.g. to initiate the performance of a barcode scan), and the like. The input device 208 illustrated in FIG. 2 can include more than one of the above-mentioned input devices. The input device 208 receives input and provides data representative of the received input to the processor 200. The device 104 further includes an output device, such as a display 212 interconnected with the processor 200. The display 212 may be integrated with the above-mentioned touch screen. The device 104 can also include other output devices (not shown), such as speaker, an LED indicator, and the like. The display 212, and any other output device included in the device 104, is configured to receive output from the processor 200 and present the output, e.g. via the emission of sound from the speaker, the rendering of visual indications on the display, and the like.

The device 104 also includes a communication interface 216, enabling the device 104 to exchange data with other computing devices, such as the access points 116 and the server 124. The communications interface 212 includes any suitable hardware (e.g. transmitters, receivers, network interface controllers and the like) allowing the device 104 to communicate according to one or more communications standards. In the present example, therefore, the communications interface 216 may include an assembly enabling communication with the access points 116 over Wi-Fi. The communications interface 216 may also include an assembly enabling communication over Bluetooth™.

The device 104 can include additional components that may be employed in location determinations. Such additional components can include an image sensor 220 (e.g. a camera) configured to capture image data and provide the image data to the processor 200. The additional components can also include a motion sensor 224, such as one or more of an accelerometer, a gyroscope, a magnetometer, and the like. The additional components can also include a microphone 228.

In addition, the device 104 can include a data capture module such as a barcode scanner 232, which can include one or more laser emitters and detectors and associated optics. The barcode scanner 232 enables the device 104 to capture and decode data from machine-readable graphics such as one- and two-dimensional barcodes. In some embodiments, the functionality of the barcode scanner 232 can be implemented by the image sensor 220 and the barcode scanner 232 itself can be omitted. That is, in some embodiments the device 104 implements the above-mentioned scanning functionality by capturing and processing images rather than by emitting laser light and detecting the reflections thereof to capture and decode data.

The components of the device 104 are interconnected by communication buses (not shown), and powered by a battery or other power source, over the above-mentioned communication buses or by distinct power buses (not shown).

The memory 204 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a locationing application 236, also referred to herein as the application 236. The device 104 is configured, via execution of the application 236 by the processor 200, to determine a location in the frame of reference 112, employing data collected via the various other components (including at least the communications interface 216) of the device 104, and also employing inference model data 238. The model data 238 is stored in the memory 204 following, for example, receipt from the server 124. As will be discussed in greater detail below, the model data 238 defines parameters for implementing an inference model.

The application 236 also configures the device 104 to collect data for provision to the server 124 or another computing device for use in generation of the model data 238. To that end, the application 236 is configured to interact with a data capture application 240, configured to control to the barcode scanner 232 to capture and decode data from a barcode or other machine-readable graphic.

In other examples, the processor 200, as configured by the execution of the applications 236 and 240, is implemented as one or more specifically-configured hardware elements, such as field-programmable gate arrays (FPGAs) and/or application-specific integrated circuits (ASICs).

Figure 3:
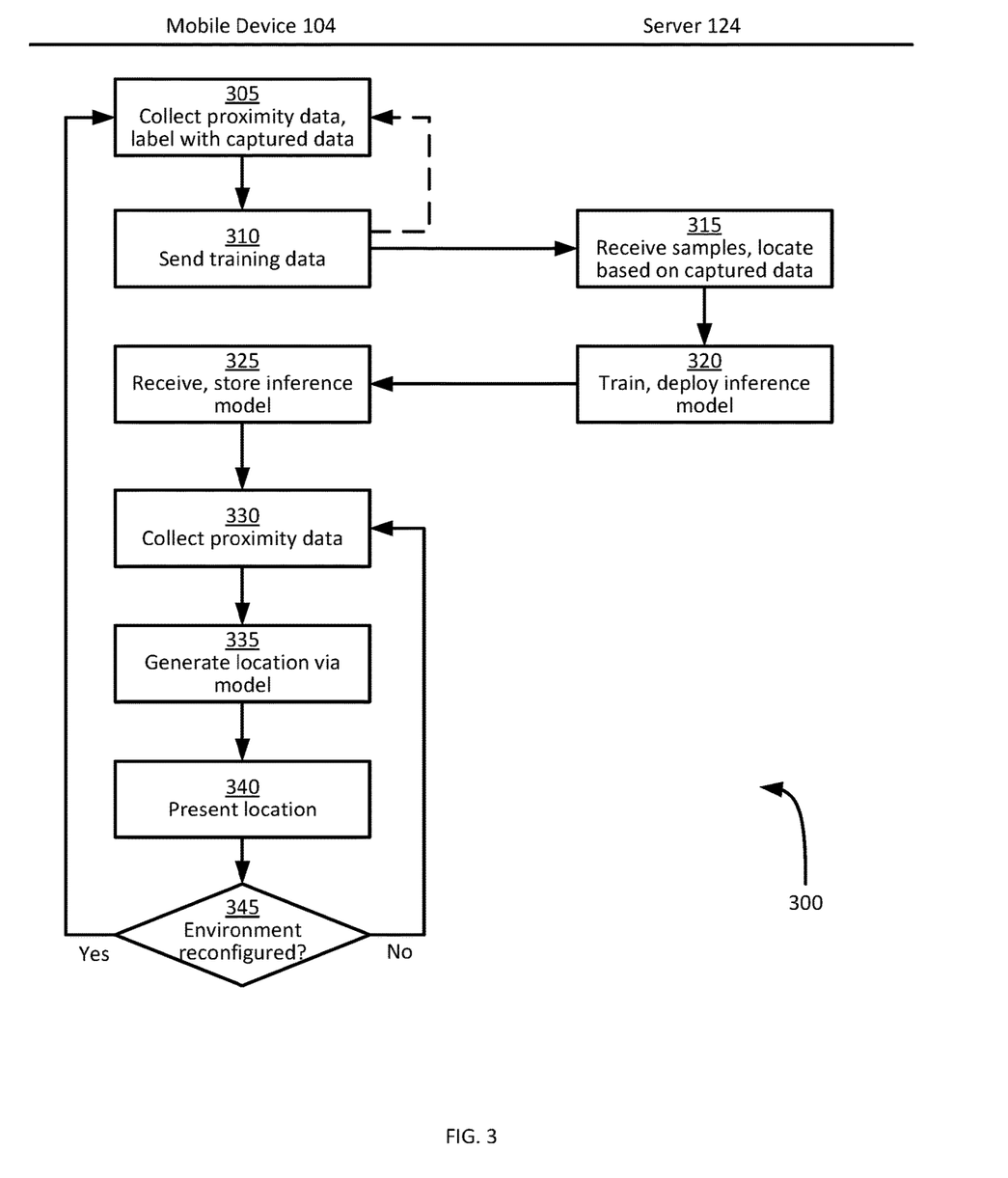
FIG. 3 is a flowchart of a method of generating inference model data and determining a location of the mobile device of FIG. 1.

The functionality of the device 104, as implemented via execution of the applications 236 and 240 by the processor 200, will now be described in greater detail with reference to FIG. 3. FIG. 3 illustrates a method 300 of generating inference model data and determining a location of the mobile device 104, which will be described in conjunction with its performance in the system 100. In particular, certain steps of the method 300 (specifically, relating to generation of model data) are illustrated as being performed by the server 124, while the remainder are illustrated as being performed by the device 104 itself.

As noted earlier, the inference model data 238 is employed by the device 104 to determine a location within the frame of reference 112. Therefore, prior to determining its location, the device 104 is configured to obtain the model data 238. In the present example, as will be described in greater detail below, the model data 238 defines a plurality of node operations corresponding to a machine learning process, such as a neural network. The node operations are employed to process data collected from the fixed transmitters to generate a location. For example, as described below in greater detail, the node operations are employed to process a set of data transmissions collected from the access points 116 to determine a location at which the set of data transmissions was collected. In other words, the node operations define a neural network or other suitable machine learning mechanism that correlates sets of transmissions collected from the access points 116 to locations in the frame of reference 112.

The node operations, as will now be apparent to those skilled in the art, are typically derived via a training process, in which a plurality of correctly labelled samples are processed to set parameters defining the node operations. Each sample includes a set of transmissions collected from the access points 116 at a given location in the frame of reference 112, labelled with that location.

The above-mentioned training process may require a significant number of samples. For example, a facility with an area of 2000 square meters may require more than forty thousand samples each labelled with a location selected from a grid of locations with a resolution of about 3×3 m. That is, to generate a model capable of correlating collected data from the access points 116 to one of about 215 locations, about two hundred samples may be required per location. In other embodiments, for example, to achieve 1 meter or better location resolution, still greater numbers of samples may be required. In some embodiments, the device 104 is therefore configured to autonomously collect samples and label the samples with barcode data or other captured data, to enable the server 124 to label the samples with locations and execute the training process.

At block 305, the device 104 is configured to collect one or more proximity indicators corresponding to at least a subset of the fixed transmitters (up to and including all of the fixed transmitters). Thus, in the present example the device 104 is configured to collect proximity indicators corresponding to at least a subset of the access points 116. The nature of the proximity indicators, and of the collection process, is dependent on the type of the fixed transmitter. For the access points 116, the proximity indicators are collected by the device 104 via the exchange of messages such as probe requests and responses, as specified by the 802.11 family of communications standards.

As will be apparent to those skilled in the art, the device 104 is configured to periodically transmit a probe request via the communications interface 216, causing any access point 116 that receives the probe request to transmit a probe response to the mobile device 104. The probe response contains, among other parameters, an identifier specific to the access point 116, such as a MAC address (in contrast to, for example, an SSID which may identify a set of access points 116 implementing a WLAN). The device 104 is configured, responsive to receiving each probe response, to determine a received signal strength indicator (RSSI) corresponding to the probe response. Thus, in the present example, the proximity indicator corresponding to a given access point includes the identifier of the access point, and the RSSI measurement, which together indicate a degree of proximity of the access point 116 to the device 104.

Figure 4A:
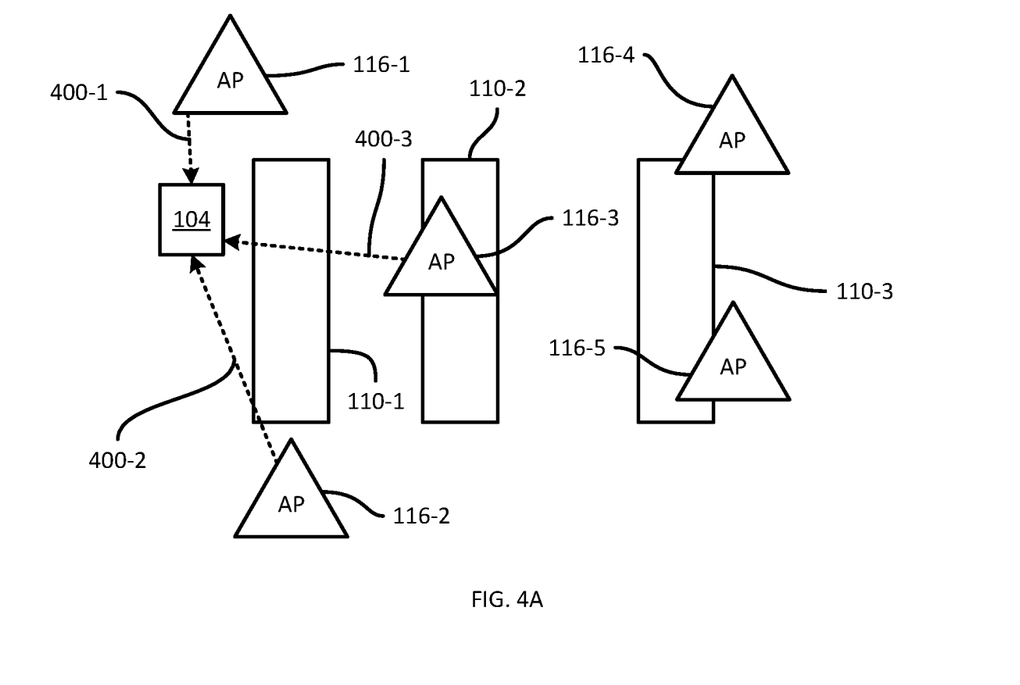
FIGS. 4A and 4B illustrate a collection and labelling of training data in accordance with the method of FIG. 3.
Figure 4B:
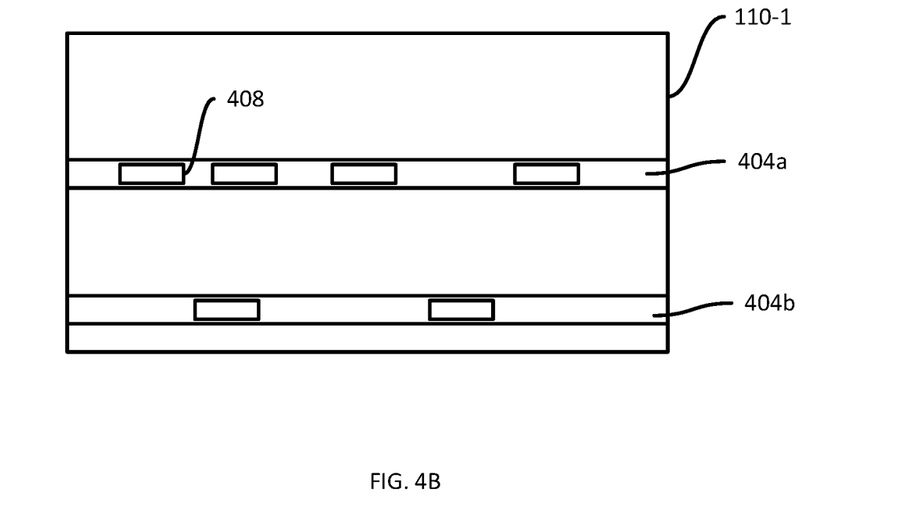

The above-mentioned access point identifiers and signal strength measurements need not be derived via probe requests and responses. In other examples, the access points 116 can be configured to periodically transmit beacons containing identifiers, which the mobile device 104 is configured to receive (e.g. without transmitting probe requests) and process to extract access point identifiers and generate signal strength measurements. Turning to FIGS. 4A and 4B, an example performance of block 305 is illustrated. In particular, FIG. 4A illustrates a top-down view of the environment 108, in which the device 104 is adjacent to the support structure 110-1. FIG. 4B illustrates a front view of the support structure 110-1, from the perspective of an operator of the device 104. At the location of the device 104 shown in FIG. 4A (which is not known to the device 104), three access points, 116-1, 116-2 and 116-3, are sufficiently close to the device 104 for the device 104 to receive probe responses, beacons, round trip time (RTT) responses or the like from the access points 116. The remaining access points (116-4 and 116-5) are too distant from the device 104 for the device 104 to receive data from them.

The device 104 receives, at block 305, transmissions 400-1, 400-2 and 400-3 from the access points 116-1, 116-2 and 116-3, respectively. Each transmission 400, as noted earlier, contains at least an identifier of the corresponding access point 116. The device 104 is further configured to generate RSSI and/or RTT measurements for each transmission 400. Table 1, below, illustrates an example set of proximity indicators generated from the transmissions 400:

TABLE 1

Example Proximity Indicators

| AP Identifier | RSSI (dB) | Tx Power (dB) | RTT (ns) |
|---|---|---|---|
| 116-1 | −42 | −21 | 100 |
| 116-2 | −51 | −21 | 130 |
| 116-3 | −50 | −18 | 125 |
| 116-4 | N/A | N/A | N/A |
| 116-5 | N/A | N/A | N/A |

The proximity indicators for each access point can also contain timestamps (not shown above) indicating the time of receipt at the device 104. In some examples, the RSSI measurements generated from the transmissions 400 are not employed directly in the proximity indicators. Instead, the device 104 can be configured to generate a path loss component of each proximity indicator based on both the RSSI measurement and a transmission power employed by the corresponding access point 116. Specifically, the path loss is determined by subtracting the RSSI measurement from the transmission power. As will be apparent to those skilled in the art, certain access points 116 may vary their transmission power over time. If the proximity data collected at block 305 and later employed to train the inference model defined by the model data 238 does not account for such variations in transmission power, locations generated via the inference model may suffer from reduced accuracy, as proximity indicators collected at a given location in the environment 108 at different times will yield different signal strength measurements.

The use of a path loss component, rather than the RSSI measurements, enables the collected proximity data to account for the above-mentioned variations in transmission power at the access points 116. Transmission power for each access point 116 can be indicated in the transmissions 400 themselves. In other examples, the transmission power can be indicated in out-of-band transmissions between the access points 116 and the device 104. In still other examples, the system 100 can include an additional appliance (not shown) configured to periodically collect current transmission powers from all access points 116 and transmit the transmission powers to the device 104, either automatically (e.g. as a recurring broadcast) or upon request.

In further embodiments, as an alternative to the RSSI measurements and path loss determinations mentioned above, the device 104 is configured to account for varying access point transmission power by obtaining an indication, from each access point 116, of RSSI measured at the access point 116 for a request (e.g. a probe request) from the device 104. The measured RSSI at the access point 116 is independent of access point transmission power (instead, it depends on transmission power at the device 104, which is known to the device 104). This is illustrated in the "Tx Power" column in Table 1.

Various other proximity indicators are contemplated. For example, the proximity indicator for each access point 116 can include, in addition to or instead of signal strength measurements such as those discussed above, round trip time measurements. The round trip time (RTT) measurements can be generated via a sequence of messages exchanged between the device 104 and the access point 116 according to the fine timing measurement (FTM) mechanism specified in the 802.11mc standard. Example RTT measurements are shown in the "RTT" column of Table 1.

Having collected the proximity indicators, the device 104 is also configured, at block 305, to label the collected proximity indicators with captured data. In general, the captured data with which the proximity indicators are labelled enables the server 124 to assign a location within the frame of reference 112 to the proximity indicators, for use in training the inference model. In the present example, the captured data includes data decoded from a barcode. Specifically, referring to FIG. 4B, the support structure 110-1 includes shelves 404a and 404b supporting labels, such as the label 408 adjacent to the mobile device 104 when the device 104 is in the location shown in FIG. 4A. Each label bears a barcode or other machine-readable graphic, and the device 104 is configured to control the barcode scanner 232 to capture and decode the barcode, for example responsive to actuation of the input device 208.

The data decoded from the label 408 can include a product identifier such as a stock keeping unit (SKU) code. Having decoded the product identifier, the device 104 is configured to label the proximity indicators with the product identifier.

Table 2 illustrates the proximity indicators shown in Table 1, labelled with a SKU code decoded from the label 408.

TABLE 2

Example Labelled Proximity Indicators

| Access Point ID | RSSI (dB) | SKU |
|---|---|---|
| 116-1 | −42 | 12345 |
| 116-2 | −51 | |
| 116-3 | −50 | |
| 116-4 | N/A | |
| 116-5 | N/A | |

As noted earlier, control of the barcode scanner 232 may be effected by the application 240, which is distinct from the application 236 in the present example. The application 236 can be configured to obtain decoded data from the application 240 by issuing a request (e.g. via an API defined by the application 240). In other examples, the application 236 can be configured to register with the application 240 as a destination for decoded data, such that the application 240 automatically transmits any decoded data to the application 236.

The data shown above (that is, the set of proximity indicators and the associated label) constitutes one sample. The device 104 can be configured to repeat the performance of block 305, for example as the operator of the device 104 performs a sequencing operation in which each label on the support structures 110 is scanned, e.g. to verify pricing, product identifiers, and the like. The rate at which the device 104 may collect proximity indicators may exceed the rate at which the device 104 is employed to scan barcodes. For example, the device 104 may collect two or more sets of proximity indicators per second, whereas a barcode scan may occur only once every two seconds. Each set of proximity indicators is labelled with the most recently captured barcode data.

Returning to FIG. 3, at block 310 the device 104 is configured to send the training data collected via the performance of block 305 to the server 124. Each sample may be sent to the server 124 as the samples are collected, or the device 104 can be configured to store the samples and transmit sets of samples to the server 124.

At block 315, the server 124 is configured to receive the training data from the device 104, and to assign locations in the frame of reference 112 based on the labels applied by the device 104. In the present example, in which the labels are product identifiers, the server 124 is configured to retrieve predefined locations corresponding to the product identifiers from the repository 128 and assign the corresponding locations to each sample. Thus, the sample of training data shown above in Table 2 is altered to produce a training sample including the proximity indicators and a location in the frame of reference 112. For example, turning to FIG. 5, the server 124 can be configured to retrieve a location corresponding to the product identifier in a sample received from the device 104, and to assign one of a plurality of regions defined by a predetermined grid 500 (e.g. with a resolution of about 3 x 3 m, although in other examples smaller or greater resolutions may be employed).

Figure 5:
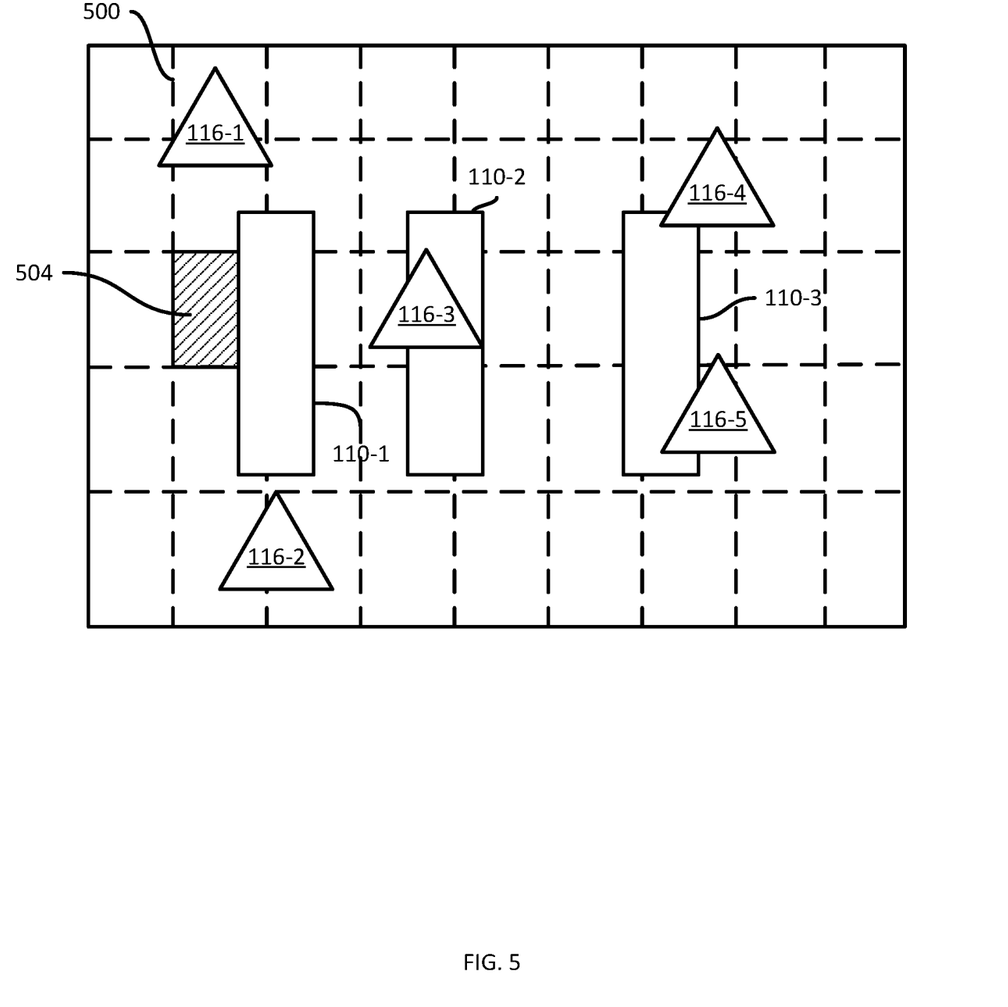
FIG. 5 illustrates an example location grid employed in the performance of the method of FIG. 3.

The assigned region contains the location corresponding to the product identifier received from the device 104. Thus, in the present example, the product identifier "12345" received from the device 104 corresponds to the label 408, which is contained in the shaded region 504 of the grid 500. The regions defined by the grid 500 may each be assigned labels, such as numerical labels beginning at the top-left corner (as illustrated in FIG. 5) and traversing each column. Thus, the shaded region 504 may have the label "8" (being the eighth region from the top-left corner of the grid 500). Table 3 illustrates the updated sample produced by the server 124, from the data shown in Table 2.

TABLE 3

Example Labelled Training Sample

| Access Point ID | RSSI (dB) | Location |
|---|---|---|
| 116-1 | −42 | 8 |
| 116-2 | −51 | |
| 116-3 | −50 | |
| 116-4 | N/A | |
| 116-5 | N/A | |

Although the examples above employ proximity indicators corresponding to the access points 116, in other examples each set of proximity indicators can include, in addition to or instead of data associated with the access points 116, data associated with other fixed transmitters. For example, the proximity indicators collected at block 305 can include any one or more of identifiers and signal strength measurements for Bluetooth™ beacons or the like. The proximity indicators can also include emitter identifiers for VLC emitters captured via the image sensor 220, as well as device orientation data (obtained via the motion sensor 224) indicating the orientation of the device 104 when the corresponding VLC emitter identifier was captured by the image sensor 220. In further examples, the proximity indicators can include transducer identifiers for audio transducers (e.g. ultrasonic speakers), along with signal strength measurements (e.g. volume detected at the microphone 228).

Other examples of labels can also be employed by the device 104 at block 305, in addition to or instead of the barcode data mentioned above. For example, when the fixed transmitters include VLC emitters, the locations of the VLC emitters may be stored in the repository 128, and employed at block 315 to assign locations to the training data collected by the device 104 at block 305.

In other embodiments, rather than defining and labeling regions in a grid, and collecting training data corresponding to each region as discussed above, the training data is labeled with two-dimensional or three-dimensional coordinates (e.g. in the frame of reference 112), and the inference model performs nonlinear regression rather than classification. For example, the output of the inference model can be two- or three-dimensional coordinates indicating specific locations within the environment.

At block 320, the server 124 is configured to execute a training process to generate the inference model data 238, for deployment to the device 104. As will be apparent to those skilled in the art, the training process involves initializing node operations (e.g. activation functions and weights for the nodes of a neural network), and processing the samples received at block 315 to generate predicted locations for each sample. Following the generation of each predicted location, an error between the predicted location and the true location assigned at block 315 for the sample is computed. Via back-propagation of the error, the node operations are modified to minimize the error in subsequent predictions. When the error falls below a predetermined threshold, the training process is complete, and the node operations are stored for deployment to the device 104.

Figure 6:
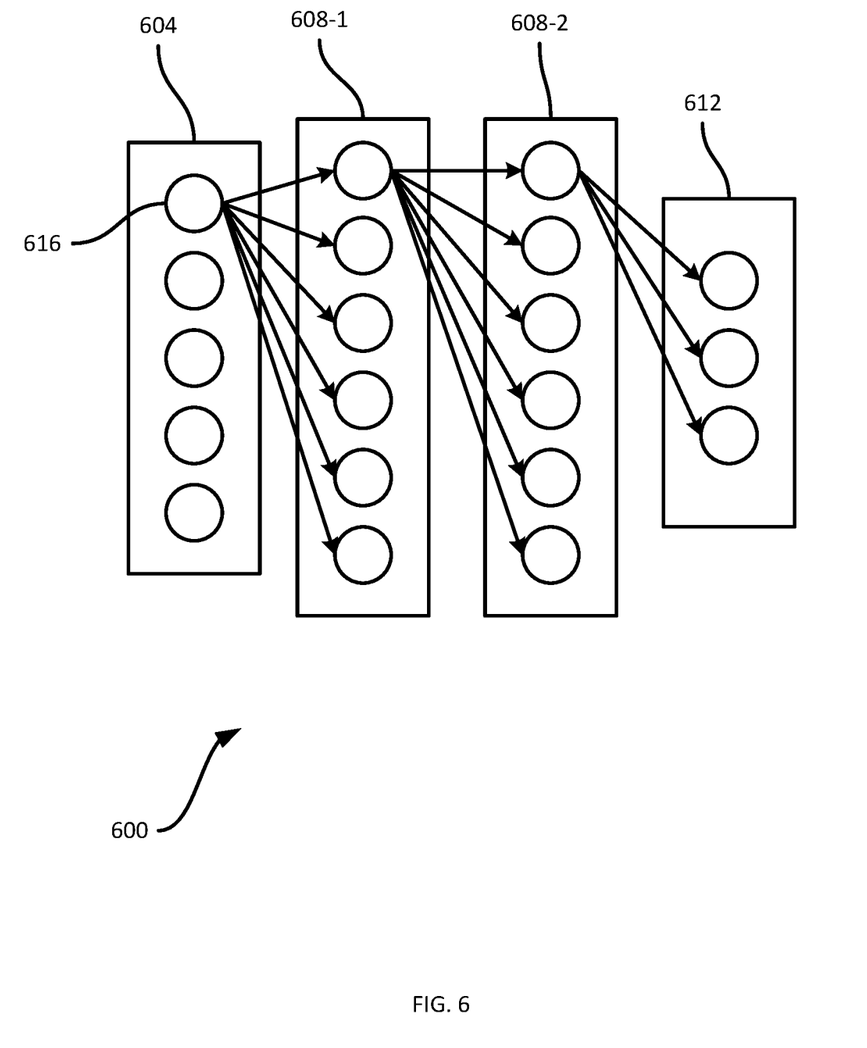
FIG. 6 illustrates an example neural network employed in the performance of the method of FIG. 3.

Referring to FIG. 6, in the present example the inference model generated at block 320 is a deep neural network (DNN) 600. Various other inference models can also be employed in other embodiments, including a Random Forest classifier, a Support Vector Machine (SVM), Nearest Neighbor Classifier or the like. The DNN 600 consists of an input layer 604, at least two internal or "hidden" layers 608-1 and 608-2, and an output layer 612. Each layer includes a plurality of nodes 616 defined by respective node operations (e.g. activation functions and weights). In general, the nodes 616 of the input layer receive as inputs the above-mentioned proximity indicators in a predetermined sequence (e.g. the RSSI measurement for the access point 116-2 is always provided to the second input node 616, e.g. by applying a hash-map between the nodes 616 and the access point identifiers). The input layer 604 can therefore include a node 616 for each input (e.g. for each RSSI measurement, as well as for each beacon identifier, ultrasonic emitter identifier, and the like, dependent on which fixed transmitters are employed).

The node operations of the input layer generate intermediate values, which are passed to the nodes 616 of the internal layer 608-1, where further node operations generate further intermediate values. As shown in FIG. 6, each node 616 in a given layer is configured to pass its output to every node in the next layer. The DNN 600 is therefore referred to as a fully connected DNN. In other examples, the nodes 616 need not be fully connected.

The nodes 616 of the output layer 612 receive input from the nodes 616 of the internal layer 608-2 and generate, via respective node operations, an indication of a location. For example, when the DNN is operated as a classifier, the output layer 612 can include one node 616 for each of the regions defined by the grid 500. Each node 616 in the output layer 612 generates a probability (e.g. from zero to one) corresponding to the respective region of the grid 500, and the greatest probability indicates the predicted location. In other examples, the DNN is operated as a nonlinear regression network. In such embodiments, the nodes 616 of the output layer 612 generate one or more values corresponding to a predicted location rather than probabilities for each of a set of possible locations. For example, the output layer 612 can include three nodes corresponding to positions in each of the X, Y and Z axes of the frame of reference 112.

When the training process at block 320 is complete, the server 124 can be configured to optimize the node operations defining the trained model before deploying the model data 238 to the device 104. For example, the server 124 can be configured to reduce the size of weights (e.g. from floating point weights to integer weights), to eliminate certain nodes (e.g. those with low weights, having little effect on the resulting prediction). The server 124 is then configured to transmit the model data 238 to the device 104, for receipt and storage in the memory 204 at block 325.

Following receipt and storage of the model data 238 at block 325, the device 104 is enabled to determine its location in the frame of reference. In some examples, the mobile device 104 need not participate in the collection of training data for generation of the model data 238 (i.e. training of the neural network). That is, in some embodiments blocks 305 and 310 can be omitted, and the performance of the method 300 at the device 104 can begin at block 325.

To determine a location, at block 330 the device 104 is configured to collect proximity indicators corresponding to a subset of the fixed transmitters (e.g. the access points 116), as described above in connection with block 305. However, at block 330 the device 104 need not label the proximity indicators. Instead, at block 335 the device 104 is configured, via execution of the application 236, to apply the node operations defined by the model data 238 to generate a location. Applying the node operations may include generating an input vector containing the proximity indicators, according to a predetermined format. For example, the input vector may be a one-dimensional vector containing each RSSI measurement in a predefined order (e.g. starting with the access point 116-1). The input vector can also include other proximity indicators collected from other types of fixed transmitters. For example, a first portion of the input vector may contain proximity indicators corresponding to the access points 116, a second portion may contain proximity indicators corresponding to Bluetooth™ beacons, and so on.

For example, as noted above the location may be generated by selecting the greatest probability from a vector of probabilities corresponding to the regions in the grid 500. Tables 4 and 5 illustrate, respectively, example proximity indicators collected upon a return of the device 104 to the location shown in FIG. 4A, and probabilities corresponding to each of the forty-five regions of the grid 500 (that is, generated by each of forty-five nodes 616 in the output layer 612) based on the proximity indicators.

TABLE 4

Example Proximity Indicators

| Access Point ID | RSSI (dB) |
|---|---|
| 116-1 | −41 |
| 116-2 | −50 |
| 116-3 | −52 |
| 116-4 | N/A |
| 116-5 | N/A |

TABLE 5

Example Location Determination

| 1 | 2 | 3 | ... | 8 | 9 | 10 | ... | 43 | 44 | 45 |
|---|---|---|---|---|---|---|---|---|---|---|
| 0.15 | 0.20 | 0.62 | ... | 0.85 | 0.53 | 0.18 | ... | 0 | 0 | 0 |

As seen above, the greatest probability generated, corresponds to the region with the label "8", corresponding to the shaded region shown in FIG. 5. Returning to FIG. 3, at block 340, the device 104 is configured to present the location generated at block 335. The presentation of the location can be accomplished by various mechanisms. For example, the device 104 can be configured to present the location on the display 212, for example as an indicator overlaid on a map of the environment 108. In other examples, the device 104 is configured at block 340 to transmit the location to the server 124 or to another computing device, in addition to or instead of presenting the location on the display 212.

At block 345, the device 104 is configured to determine whether the environment 108 has been reconfigured. Reconfiguration of the environment 108 can include the re-location of fixed transmitters such as the access points 116, the addition or removal of fixed transmitters, and the like. Reconfiguration of the environment 108 requires regeneration of the model data 238, and following an affirmative determination at block 345, the device 104 is therefore configured to proceed to block 305. When the determination at block 345 is negative, the device 104 returns to block 330 to generate a further location estimate.

The determination at block 345 can be performed, for example, via the receipt of an instruction at the device 104 to initiate a sample-collection mode of the application 236 (rather than a location determination mode). The instruction can be received from the server 124, or from an operator of the device 104 via the input device 208. The instruction can include not only an instruction to begin the performance of block 305, but also an indication of which proximity indicators to collect (e.g. whether to enable both Wi-Fi and Bluetooth™ radios of the communications interface 216).

Variations to the above systems and methods are contemplated. For example, the collection of proximity indicators at blocks 305 and 330 can include the generation of aggregated proximity indicators. For example, in addition to collection individual proximity indicators such as RSSI measurements for each access point 116, the device 104 can be configured to generate one or more aggregated proximity indicators corresponding to a predefined combination of access points 116. For example, one aggregated proximity indicator may be the average of the RSSI measurements for the access points 116-1, 116-2 and 116-5. Another aggregated proximity indicator may average of the RSSI measurements for the access points 116-2 and 116-3. As will now be apparent, any of a wide variety of aggregated proximity indicators can be generated at blocks 305 and 330 for application to respective nodes 616 of the input layer 604. The aggregated proximity indicators can be employed in addition to, or instead of, the individual proximity indicators. In further examples, the proximity indicators collected at blocks 305 and 330 can include a number of fixed transmitters detected. Thus, in the example shown in FIG. 4A, the proximity indicators can include those shown in Table 1, as well as a count of the access points 116 for which proximity indicators were collected (three, in the example of FIG. 4A).

In further examples, proximity indicators collected from the fixed transmitters can be supplemented with motion data obtained via the motion sensor 224. For example, the proximity indicators can include both those collected from fixed transmitters such as the access points 116 and a magnetometer measurement. The environment 108 may include objects (such as the support structures 110) that distort the geomagnetic field detected by a magnetometer, and therefore may be employed to determine the location of the device 104. The magnetometer reading may be processed to render the reading independent of device orientation prior to application to a node 616 of the input layer 604.

Figure 7:
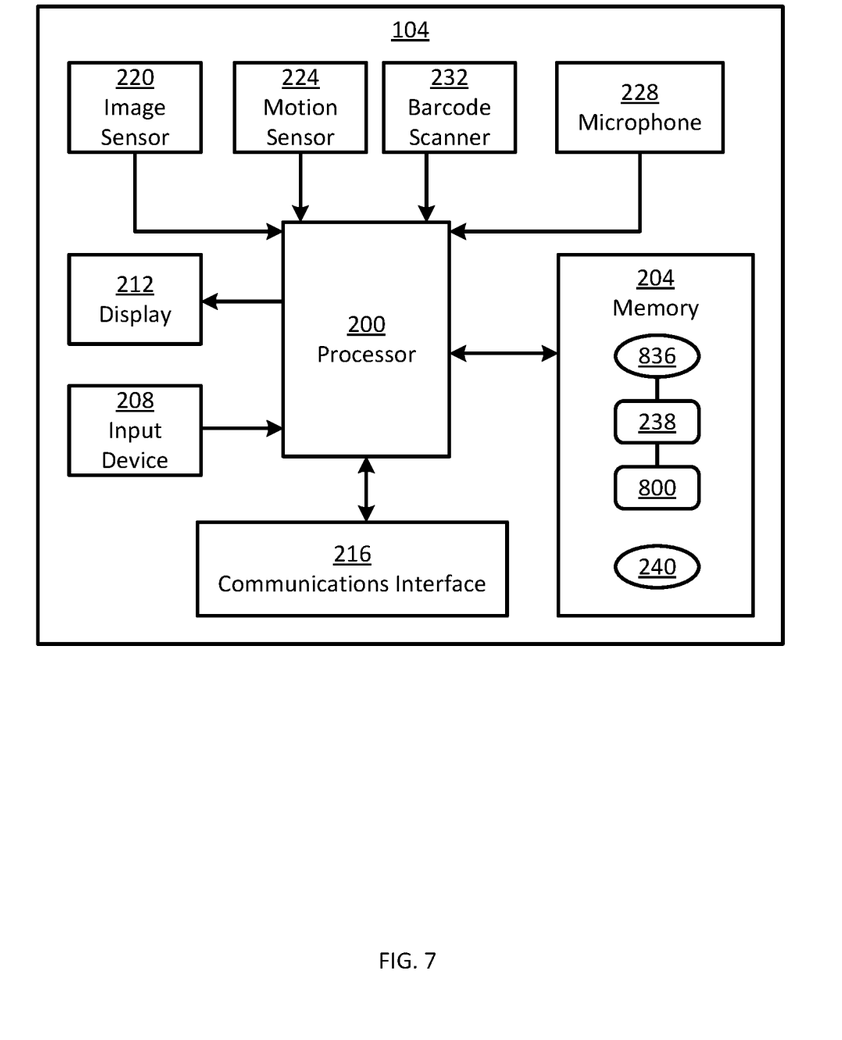
FIG. 7 is a block diagram of certain internal components of a mobile device in the system of FIG. 1, according to another embodiment.

In further embodiments, the device 104 can implement two inference models. Turning to FIG. 7, the device 104 is shown according to another embodiment, in which the application 236 is replaced with an application 836, and in which the memory 204 stores the model data 238 (also referred to below as primary model data) and secondary model data 800. In brief, the primary model data 238 is employed as described above, while the secondary model data 800 defines a recurrent neural network that receives as input (i) the location generated with the primary model data 238 and (ii) motion data obtained via the motion sensor 224.

Figure 8:
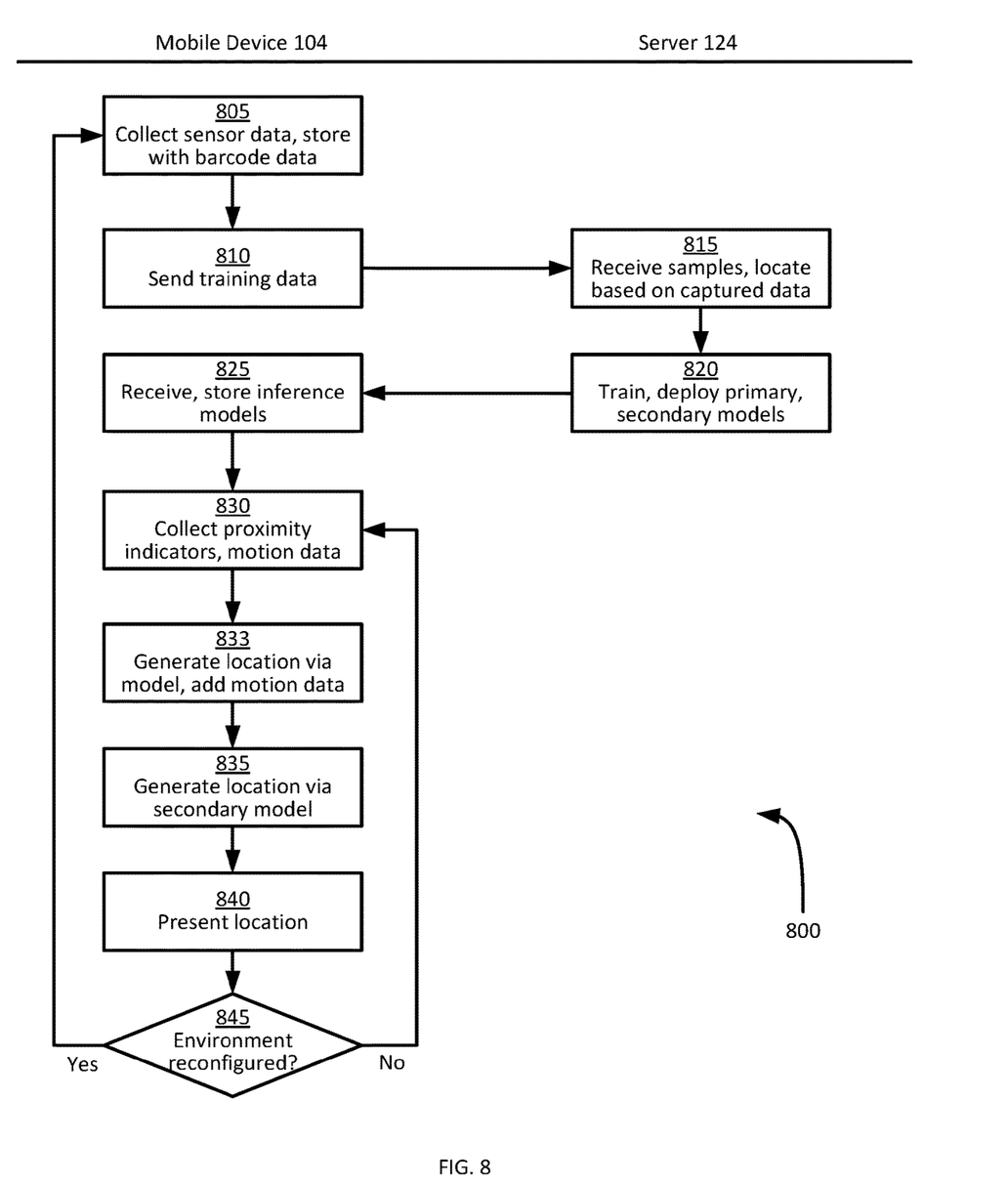
FIG. 8 is a flowchart of a method of generating inference model data and determining a location of the mobile device of FIG. 1, according to another embodiment.

Turning to FIG. 8, a method 800 of generating inference model data and determining a location of the mobile device 104 is shown. Unless indicated below, the blocks of the method 800 are performed as described above in connection with the block of the method 300 having the same two-digit suffix.

At block 805, the device 104 is configured to collect both proximity indicators as described above, and motion data from the motion sensor 224, such as acceleration and orientation data. The collected data is labelled and sent to the server 124 as described above. The server 124 is configured to assign locations to the training data at block 815. At block 820, the server 124 is configured to train and deploy both the DNN noted above and a recurrent neural network (RNN). In particular, the recurrent neural network takes as input the output of the DNN (e.g. probabilities associated with regions in the grid 500) and the above-mentioned motion data. The RNN generates as output a predicted location, for example in a format similar to that of the DNN (e.g. a vector of probabilities corresponding to respective regions in the grid 500). As will be apparent to those skilled in the art, an RNN generates output according to both current input and one or more previous output samples. Thus, the RNN defined by the model data 800 generates a predicted location based on both the current output of the DNN and the current motion sensor data, and at least one previous location generated by the RNN itself.

The device 104, having received and stored both the primary model data 238 and the secondary model data 800 at block 825, is configured to collect proximity indicators and motion data at block 830. At block 833, the device 104 is configured to generate a location as described above in connection with block 335, by applying the proximity indicators to the DNN (i.e. by executing the node operations defined in the primary model data 238). At block 835, the device 104 is then configured to generate a final location prediction by applying the node operations in the model data 800 to an input vector consisting of both the output from block 833 and the motion sensor data collected at block 830. The location generated at block 835 is then presented at block 840, before proceeding to the determination at block 845.

The use of primary and secondary model data 238 and 800, in combination with motion sensor data, may permit the device 104 to generate a more accurate location prediction than through the use of the model data 238 alone.

Figure 9:
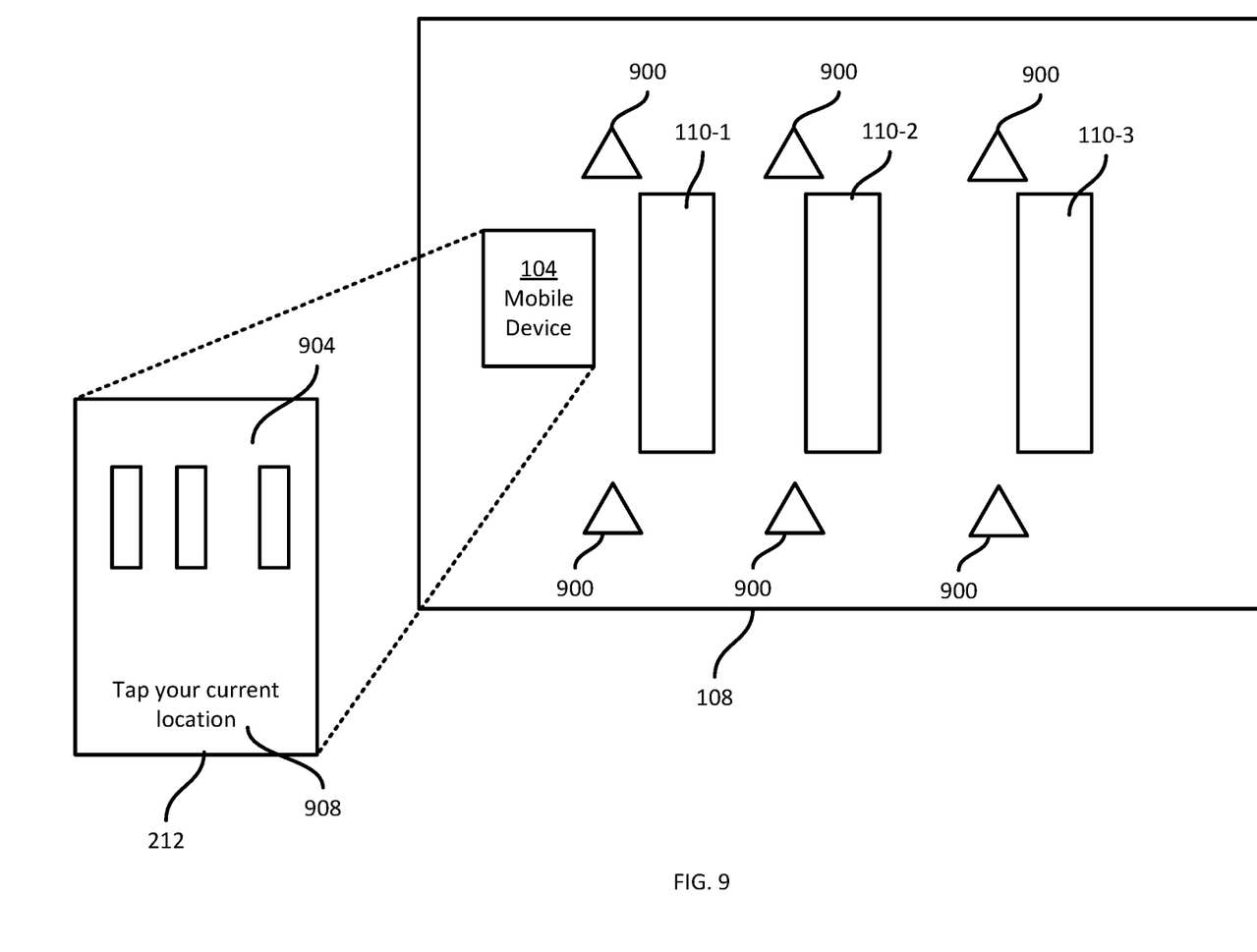
FIG. 9 illustrates collection and labelling of training data in accordance with another embodiment.

In further variations, referring to FIG. 9, other labelling mechanisms for use at blocks 305 and 805 are also contemplated. For example, as shown in FIG. 9 an array of beacons 900 (e.g. Bluetooth™ beacons) can be deployed in the environment 108 (e.g. temporarily during the collection of training data). The access points 116 are not illustrated in FIG. 9 for simplicity. The device 104 can be configured to collect proximity indicators as noted above (including from the access points 116), and to also collect identifiers of nearby beacons 900. The device 104 is also configured to collect motion sensor data. The server 124 stores the locations of the beacons 900, and labels each sample based on the known beacon locations and the motion sensor data. For example, if the motion sensor data indicates a constant speed of travel for a set of samples captured between two beacons, interpolated locations (between the known locations of the two beacons) may be assigned to each sample.

In addition to, or instead of, the use of beacons 900 and motion sensor-based interpolation noted above, the device 104 can be configured to present a map 904 on the display 212. The device 104 stores, in conjunction with the map 904, locations of each point in the map 904 in the frame of reference 112. An operator of the device 104 can periodically (e.g. responsive to a text prompt 908 on the display 212, an audio prompt or the like, or without prompting) select a location on the map 904 corresponding to the current location of the device 104 in the environment 108. For example, the operator can select a location on the map 904 upon arriving at various landmarks within the environment 108, such as aisle intersections and the like. The device 104 is configured to collect proximity indicators as described above, and responsive to selection of a point on the map 904, the device 104 is configured to label sample sets of proximity indicators with a physical location (in the frame of reference 112) corresponding to the selected location on the map 904. Samples of proximity indicators collected between selections on the map 904 can be labelled with locations interpolated based on motion data from the motion sensor 224. For example, the device 104 can be configured to execute a concurrent odometry and mapping process (and/or a step counter) to interpolate such locations.

In further embodiments, operator selections of locations (e.g. from a map as described above) can be supplemented by a continuous inertial odometry mechanism by which the device 104 correlates inertial data from the motion sensor 224 with optical (e.g. image or video) data from the image sensor 220 (e.g. via sensor fusion of the inertial and optical data). The optical data may indicate, for example, the position and orientation of the device 104 relative to a VLC transmitter or the like with a known location in the environment. The use of such known locations as reference points for correlation with inertial data enables the device 104 to interpolate or extrapolate positions between the reference points via the inertial data from the motion sensor 224.

In still further embodiments, the division of functionality between the mobile device 104 and the server 124 noted above may be modified. In general, any suitable location generator device (including both the mobile device 104 and the server 124) can be configured to perform the generation of a location of the mobile device 104. For example, the server 124 can be configured to perform not only the training activities described above (e.g. in connection with blocks 315 and 320, as well as blocks 815 and 820), but also the determination of location for the mobile device 104. For example, the mobile device 104 can be configured in such embodiments to collect proximity data at block 330 (and block 830), and to transmit the proximity data to the server 124. The server 124, in turn, is configured in such embodiments to perform blocks 335 and 340 (and blocks 833, 835 and 840). Block 325, meanwhile, can be omitted and the inference model can be maintained at the server 124 alone. In such embodiments, the mobile device 104 is also configured to collect training data and send the training data, as described above in connection with blocks 305 and 310 (and blocks 805 and 810). Presentation of the location at blocks 340 and 840 in these embodiments can include transmitting the location from the server 124 to the mobile device 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of determining a location of a mobile device in a system having a plurality of fixed transmitters, the method comprising:
    obtaining, at a location generator device, inference model data defining a plurality of node operations;
    collecting, at the mobile device, respective proximity indicators corresponding to a subset of the fixed transmitters, each proximity indicator representing a proximity of the mobile device to the respective fixed transmitter;
    at the location generator device, generating a location according to the proximity indicators and the node operations; and
    presenting the location,
    wherein the method further comprises, prior to obtaining the inference model data:
        collecting training proximity indicators,
        labelling the training proximity indicators based on captured data, and
        transmitting the labelled training proximity indicators to a server for use in generation of the inference model data.

2. The method of claim 1, wherein obtaining the inference model comprises receiving the inference model from the server.

3. The method of claim 1, wherein the plurality of node operations define a deep neural network.

4. The method of claim 1, wherein each proximity indicator includes an identifier of the corresponding fixed transmitter and an indication of at least one of signal strength for the corresponding fixed transmitter and a round trip time (RTT) for the corresponding fixed transmitter.

5. The method of claim 4, wherein the fixed transmitters include wireless access points, and wherein the indication of signal strength includes one of (i) a received signal strength indicator (RSSI) for the corresponding wireless access point and (ii) a path loss measurement for the corresponding wireless access point.

6. The method of claim 1, wherein presenting the location includes:
    presenting a map of the system on a display of the mobile device with an overlay corresponding to the generated location.

7. The method of claim 1, further comprising:
    obtaining, at the mobile device, secondary inference model data defining a second plurality of node operations;
    collecting, with the proximity indicators, motion data from a motion sensor of the mobile device;
    generating an initial location according to the proximity indicators and the node operations; and
    generating a final location according to the initial location, the motion data and the second plurality of node operations;

wherein presenting the location comprises presenting the final location.

8. The method of claim 7, wherein the second plurality of node operations define a recurrent neural network.

9. The method of claim 7, wherein the motion data includes one or more of accelerometer data, gyroscope data and magnetometer data.

10. The method of claim 1, wherein the location generator device is one of the mobile device and a server.

11. The method of claim 1, wherein the labelling the training proximity indicators comprises capturing a barcode, and labelling the training proximity indicators with data decoded from the barcode.

12. The method of claim 1, wherein the labelling the training proximity indicators includes:
 presenting a map on a display of the mobile device;
 receiving a selection of a position on the map; and
 labelling the training proximity indicators with a location corresponding to the position selected on the map.

13. The method of claim 1, wherein the labeling the training proximity indicators based on captured data includes correlating first sensor data with second sensor data to determine one or more reference points in an environment of the mobile device and inferring one or more labels of the training proximity indicators based on the one or more reference points.

14. The method of claim 13, wherein the first sensor data includes image sensor data and the second sensor data includes inertial sensor data of the mobile device.

15. The method of claim 1, wherein the processor is configured to label the training proximity indicators based on captured data by correlating first sensor data with second sensor data to determine one or more reference points in an environment of the mobile device and inferring one or more labels of the training proximity indicators based on the one or more reference points.

16. The method of claim 15, wherein the first sensor data includes image sensor data and the second sensor data includes inertial sensor data of the mobile device.

17. A mobile device, comprising:
 a memory;
 a sensor configured to detect a plurality of fixed transmitters;
 a processor interconnected with the memory and the sensor, the processor configured to:
  obtain inference model data defining a plurality of node operations;
  collect respective proximity indicators corresponding to a subset of the fixed transmitters, each proximity indicator representing a proximity of the mobile device to the respective fixed transmitter;
  generate a location according to the proximity indicators and the node operations; and
  present the location,
   wherein the processor is further configured, prior to obtaining the inference model data, to:
  collect training proximity indicators,
  label the training proximity indicators based on captured data, and
  transmit the labelled training proximity indicators to a server for use in generation of the inference model data.

18. The mobile device of claim 17, wherein the plurality of node operations define a deep neural network.

19. The mobile device of claim 17, wherein each proximity indicator includes an identifier of the corresponding fixed transmitter and an indication of signal strength for the corresponding fixed transmitter.

20. The mobile device of claim 19, wherein the fixed transmitters include wireless access points, and wherein the indication of signal strength includes one of (i) a received signal strength indicator (RSSI) for the corresponding wireless access point and (ii) a path loss measurement for the corresponding wireless access point.

21. The mobile device of claim 17, further comprising a display; wherein the processor is further configured to present the location by presenting a map on the display with an overlay corresponding to the generated location.

22. The mobile device of claim 17, further comprising a motion sensor; wherein the processor is further configured to:
 obtain secondary inference model data defining a second plurality of node operations;
 collect, with the proximity indicators, motion data from the motion sensor;
 generate an initial location according to the proximity indicators and the node operations; and
 generate a final location according to the initial location, the motion data and the second plurality of node operations; and
 present the final location.

23. The mobile device of claim 22, wherein the second plurality of node operations define a recurrent neural network.

24. The mobile device of claim 22, wherein the motion sensor includes one or more of an accelerometer, a gyroscope and a magnetometer.

25. The mobile device of claim 17, wherein the processor is configured to obtain the inference model by receiving the inference model from a server.

26. The mobile device of claim 16, wherein the processor is further configured to label the training proximity indicators by capturing a barcode, and labelling the training proximity indicators with data decoded from the barcode.

27. The mobile device of claim 16, further comprising a display; wherein the processor is further configured to label the training proximity indicators by:
 presenting a map on the display;
 receiving a selection of a position on the map; and
 labelling the training proximity indicators with a location corresponding to the position selected on the map.

28. A server, comprising:
 a memory;
 a communications interface; and
 a processor interconnected with the memory and the communications interface, the processor configured to:
  obtain inference model data defining a plurality of node operations;
  receive, from a mobile device, respective proximity indicators corresponding to a subset of a plurality of fixed transmitters, each proximity indicator representing a proximity of the mobile device to the respective fixed transmitter as detected by a sensor of the mobile device;
  generate a location of the mobile device according to the proximity indicators and the node operations; and
  present the location,
   wherein the processor is further configured, prior to obtaining the inference model data, to receive labelled training proximity indicators based on captured data from the mobile device for use in generation of the inference model data.

\* \* \* \* \*